United States Patent
Huang et al.

(10) Patent No.: US 10,154,417 B2
(45) Date of Patent: Dec. 11, 2018

(54) NETWORK NODE AND A METHOD THEREIN FOR COMPUTING CELL RANGE EXPANSION (CRE) VALUES

(71) Applicant: Telefonaktiebolaget LM Ericsson (publ), Stockholm (SE)

(72) Inventors: Vincent Huang, Sollentuna (SE); Asa Bertze, Spånga (SE); Steven Corroy, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 42 days.

(21) Appl. No.: 15/500,450

(22) PCT Filed: Sep. 8, 2014

(86) PCT No.: PCT/SE2014/051028
§ 371 (c)(1),
(2) Date: Jan. 30, 2017

(87) PCT Pub. No.: WO2016/039669
PCT Pub. Date: Mar. 17, 2016

(65) Prior Publication Data
US 2017/0223551 A1    Aug. 3, 2017

(51) Int. Cl.
*H04W 16/26*  (2009.01)
*H04W 36/00*  (2009.01)
(Continued)

(52) U.S. Cl.
CPC ........... *H04W 16/26* (2013.01); *H04W 24/08* (2013.01); *H04W 36/0083* (2013.01); *H04W 28/08* (2013.01); *H04W 36/04* (2013.01)

(58) Field of Classification Search
CPC .. H04W 16/14; H04W 24/10; H04W 72/0453
(Continued)

(56) References Cited

U.S. PATENT DOCUMENTS 9,432,901 B1 *  8/2016  Kwan ................. H04W 36/245
9,847,855 B2 * 12/2017  Siomina ................. H04L 1/189
(Continued)

FOREIGN PATENT DOCUMENTS

| EP | 2760237 A1 | 7/2014 |
| EP | 2840826 A1 | 2/2015 |
| WO | 2013166694 A1 | 11/2013 |

OTHER PUBLICATIONS

Akkiraju, N. et al. Title: "Alpha Shapes: Definition and Software," 1995_P-06. Workshop on Mathematical Methods in Computer Vision, The Geometry Center, University of Minnesota, Minneapolis, MN, Sep. 11-15, 1995 consisting of 4-pages.
(Continued)

Primary Examiner — Stephen J Clawson
(74) Attorney, Agent, or Firm — Sage Patent Group

(57) ABSTRACT

A method in a network node for computing a Cell Range Expansion (CRE) value. The network node obtains a first value of a measure of the performance of the wireless communications network. The network node creates a first relationship relating the first value of the parameter to the first CRE value and the first measure of the performance of the wireless communications network, based on the first value of the parameter and the first value of the measure of the performance. The network node creates a second relationship relating the second value of the parameter to a second CRE value and a second value of the measure of the performance of the wireless communications network, based on the first relationship and on the second value of the parameter. The network node computes the second CRE value based on a second value of the parameter, and the second relationship.

20 Claims, 6 Drawing Sheets

(51) Int. Cl.
*H04W 24/08* (2009.01)
*H04W 28/08* (2009.01)
*H04W 36/04* (2009.01)

(58) Field of Classification Search
USPC .................................................. 370/252
See application file for complete search history.

(56) References Cited

U.S. PATENT DOCUMENTS

| | | | | |
|---|---|---|---|---|
| 2012/0009969 | A1* | 1/2012 | Park | H04W 52/10 455/522 |
| 2013/0095829 | A1* | 4/2013 | Bhattad | H04B 1/7107 455/434 |
| 2013/0242748 | A1* | 9/2013 | Mangalvedhe | H04W 24/02 370/241 |
| 2013/0303167 | A1* | 11/2013 | Zhu | H04W 4/90 455/436 |
| 2014/0302868 | A1* | 10/2014 | Miki | H04W 72/087 455/452.2 |
| 2015/0065192 | A1* | 3/2015 | Sun | H04W 16/26 455/522 |
| 2015/0172977 | A1* | 6/2015 | Koc | H04W 36/0083 455/437 |
| 2015/0208410 | A1* | 7/2015 | Koutsimanis | H04W 24/10 370/252 |
| 2016/0057666 | A1* | 2/2016 | Pang | H04W 36/0083 370/252 |
| 2016/0119835 | A1* | 4/2016 | Sun | H04W 16/32 455/444 |
| 2016/0353451 | A1* | 12/2016 | Ko | H04W 16/04 |

OTHER PUBLICATIONS

Supplementary European Search Report dated May 22, 2017 for European Application No. EP 14 90 1694, consisting of 2-pages.
International Search Report and Written Opinion dated Apr. 28, 2015 for International Application Serial No. PCT/SE2014/051028, International Filing Date: Aug. 9, 2014 consisting of 12-pages.
Corroy S, Falconetti L, Mathar R., Title: "Dynamic Cell Association for Downlink Sum Rate Maximization in Multi-Cell Heterogeneous Networks,." Published In: 2012 IEEE International Conference on Communications (ICC), pp. 2457-2461, Jun. 10, 2012 consisting of 5-pages.
Corroy S, Mathar R., Title: "Semidefinite Relaxation and Randomization for Dynamic Cell Association in Heterogeneous Networks." Published In: 2012 IEEE Global Communications Conference (GLOBECOM), pp. 2373-2378, Dec. 3-7, 2012 consisting of 6-pages.
Simsek M, Bennis M, Czylwik A. Dynamic Inter-Cell Interference Coordination in HetNets: A Reinforcement Learning Approach, Published In: 2012 IEEE Global Communications Conference (GLOBECOM), pp. 5446-5450, Dec. 3, 2012 consisting of 5-pages.
Kudo T, Ohtsuki T., Title: "Cell Range Expansion using Distributed Q-Learning in Heterogeneous Networks." Published In: EURASIP Journal on Wireless Communications and Networking. vol. 1:61(1-10) Mar. 4, 2013 consisting of 10-pages.
Khan Y, Sayrac B, Moulines E., Title: "Surrogate Based Centralized SON: Application to Interference Mitigation in LTE-A HetNets," Published In: 2013 IEEE 77th Vehicular Technology Conference (VTC Spring), pp. 1-5, Jun. 2-5, 2013 consisting of 5-pages.
Gu X, Li W, Zhang L, Title: "Adaptive Cell Range Control in Heterogeneous Network," Published In: 2013 International Conference on Wireless Communications & Signal Processing (WCSP), pp. 1-5. Oct. 24-26, 2013 consisting of 5-pages.
Kudo T, Ohtsuki T. Cell Selection using Distributed Q-learning in Heterogeneous Network, Published In: 2013 Asia-Pacific Signal and Information Processing Association Annual Summit and Conference (APSIPA), pp. 1-6, Oct. 29-Nov. 1, 2013 consisting of 6-pages.
Mishra S, Sengupta A, Murthy CS., Title: "Enhancing the Performance of HetNets via Linear Regression Estimation of Range Expansion Bias.," Plublished In: 2013 19th IEEE International Conference on Networks (ICON), pp. 1-6, Dec. 11, 2013 consisting of 6-pages.
Sun SS, Liao W, Chen WT., Title: "Traffic Offloading with Rate-Based Cell Range Expansion Offsets in Heterogeneous Networks," Published In: 2014 IEEE Wireless Communications and Networking Conference (WCNC), pp. 2833-2838, Apr. 6, 2014 consisting of 6-pages.
Tian P, Tian H, Zhu J, Chen L, She X., Title: "An Adaptive Bias Configuration Strategy for Range Extension in LTE-Advanced Heterogeneous Networks," Published In: IET International Conference on Communication Technology and Application (ICCTA 2011), pp. 336-340, Oct. 14-16, 2011 consisting of 5-pages.

* cited by examiner

NETWORK NODE AND A METHOD THEREIN FOR COMPUTING CELL RANGE EXPANSION (CRE) VALUES

CROSS-REFERENCE TO RELATED APPLICATIONS

This application is a submission under 35 U.S.C. § 371 for U.S. National Stage Patent Application of International Application Number: PCT/SE2014/051028, filed Sep. 8, 2014 and entitled "NETWORK NODE AND A METHOD THEREIN FOR COMPUTING CELL RANGE EXPANSION (CRE) VALUES," the entirety of which is incorporated herein by reference.

TECHNICAL FIELD

Embodiments herein relate to a network node and a method therein. In particular, they relate to computing CRE values.

BACKGROUND

Communication devices such as User Equipments (UE) are also known as e.g. mobile terminals, wireless terminals and/or mobile stations. User equipments are enabled to communicate wirelessly in a wireless communications network, sometimes also referred to as a wireless communication system, a cellular communications network, a cellular radio system or a cellular network. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The wireless communications network covers a geographical area which is divided into cell areas, wherein each cell area is served by a base station, e.g. a Radio Base Station (RBS), which sometimes may be referred to as e.g. "eNB", "eNodeB", "NodeB" or "B node" depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. 3GPP LTE radio access standard has been written in order to support high bitrates and low latency both for uplink and downlink traffic. All data transmission is in LTE is controlled by the radio base station.

Heterogeneous Networks

A promising and practical approach to increase the throughput for UEs in a cellular communications network is by using heterogeneous networks (HetNets). The idea is to deploy smaller base stations where data requirements are the highest in order to provide a good service even in crowded geographical areas, where it is not possible to deploy more standard base stations. These smaller base stations are much cheaper and transmit with a much lower power than the standard base stations.

Types of Base Stations in HetNets

Macro nodes are the standard base stations, as deployed nowadays. Macro nodes transmit with the highest power and may therefore serve UEs at the furthest distance. Macro nodes typically use a transmit power of 40 W and are designed to cover larger areas like city districts. An area comprising all UEs served by a macro node is called a macrocell.

Pico nodes are smaller base stations than the standard base stations, and have a significantly lower transmit power. Pico nodes serve UEs in much smaller geographical areas, e.g., a mall or a metro station. Such a geographical area with a high UE density may be called a hotspot. Pico nodes typically use a transmit power of 1 W. An area comprising all UEs served by a pico node is called a picocell.

Femto nodes are the smallest base stations. They are typically used to cover a small office or a house.

In the following only the terms macro and pico nodes will be employed to describe high and low power nodes.

Cell Selection in HetNets

When a UE needs to join the wireless communications network, it first has to find which are the cells in its neighborhood and then select which one of them it will be associated to.

The role of the cell selection algorithm is to decide which cell to connect to, based on measurements performed on multiple cells within range for the UE.

The cell selection algorithm is typically a cell-based algorithm, which means that it affects all UEs in the cell, each time it is processed. Typically the cell selection occurs periodically, when it is assumed that the channel conditions have changed drastically, and also based on the network itself, i.e., when the UE enters or leaves the cell, i.e. when the UE is handed over to another cell.

There exist several methods to associate UEs to cells. For example, at the time a UE needs to be associated to a base station, it measures the received power from each base station within range of such measurements. This UE may then be associated to the base station from which the largest power was received. This may be referred to as the Reference Signal Received Power (RSRP) method.

Another method is the Cell Range Extension (CRE) method. The main idea of the CRE method is to virtually increase the range of the pico nodes by a fixed factor. The difference with respect to the RSRP method is that the UE is only associated to a macro node if the received power from the macro node is higher than the received power from the pico node plus the fixed extension factor. In other words, for cell selection the CRE value is an offset value between two cells, such as a pico cell and a macro cell.

The range extension enables to balance the distribution of the users between the macro and pico nodes. In this way the pico node is guaranteed to be serving a significant amount of UEs.

However, in heterogeneous networks cell selection is particularly complex due to the power imbalance between the high power nodes, e.g. macro nodes, and the low power nodes, such as pico or femto nodes. Pushing UEs toward the low power nodes results in a poor downlink Signal to Interference and Noise Ratio (SINR) for cell edge UEs. Pushing UEs towards the high power nodes results in an underutilization of the bandwidth resources and in a poorer uplink channel quality than could have been achieved for the UE in the low power node.

SUMMARY

It is therefore an object of embodiments herein to provide an improved way of cell selection.

According to a first aspect of embodiments herein, the object is achieved by a method in a network node for computing a Cell Range Expansion, CRE, value in a wireless communications network. The wireless communications network comprises a first cell, a second cell, and a user equipment located in a coverage area of the first cell and the second cell.

The network node obtains a first value of a measure of the performance of the wireless communications network. The first value of the measure is related to a first CRE value, which first CRE value is related to the first cell and the second cell. The first value of the measure is further related to a first value of a parameter related to one or more out of: the user equipment, and the first cell, and the second cell.

The network node creates a first relationship relating the first value of the parameter to the first CRE value and the first measure of the performance of the wireless communications network, based on a first training data set comprising the first CRE value, the first value of the parameter and the first value of the measure of the performance.

The network node creates a second relationship relating a second value of the parameter to a second CRE value and a second value of the measure of the performance of the wireless communications network, based on the first relationship and on the second value of the parameter.

The network node computes the second CRE value based on a second value of the parameter, and on the second relationship, relating the second value of the parameter to the second CRE value.

According to a second aspect of embodiments herein, the object is achieved by a network node for computing a Cell Range Expansion, CRE, value in a wireless communications network. The wireless communications network is configured to comprise a first cell, a second cell, and a user equipment arranged to be located in a coverage area of the first cell and the second cell.

The network node is adapted to obtain a first value of a measure of the performance of the wireless communications network. The first value of the measure is related to a first CRE value, which first CRE value is related to the first cell and the second cell. The first value of the measure is further related to a first value of a parameter related to one or more out of: the user equipment, the first cell, and the second cell.

The network node is further adapted to create a first relationship relating the first value of the parameter to the first CRE value and the first measure of the performance of the wireless communications network, based on a first training data set comprising the first CRE value, the first value of the parameter and the first value of the measure of the performance.

The network node is further adapted to create a second relationship relating a second value of the parameter to a second CRE value and a second value of the measure of the performance of the wireless communications network, based on the first relationship and on the second value of the parameter.

The network node is further adapted to compute the second CRE value based on a second value of the parameter and the second relationship, relating the second value of the parameter to the second CRE value.

The network node creates the second relationship relating the second value of the parameter to the second CRE value and the corresponding second value of the measure of the performance of the wireless communications network, based on the first relationship and on the second value of the parameter.

Since the network node computes the second CRE value based on the second value of the parameter, and on the second relationship, the second CRE value optimises the performance of the wireless communications network for the second value of the parameter, i.e. for a new condition of the wireless communications network in terms of a parameter related to one or more of the user equipment, the first cell and the second cell.

An advantage with embodiments herein is that the second CRE value is computed based on the first relationship and the second relationship, each relating a value of the parameter to a CRE value and a measure of the performance of the wireless communications network.

A further advantage with embodiments herein is that the second CRE value is computed based on the first value and the second value of the parameter related to one or more out of: the user equipment, the first cell, and the second cell.

A further advantage with embodiments herein is that the second CRE value may be computed based on a difference between a measured second value of the performance and a computed second value of the measure of the performance.

A further advantage with embodiments herein is that the measured second value of the performance is related to a modified second CRE value, which modified second CRE value is based on a random modification of a computed second CRE value.

Embodiments herein enable to predict the performance of the CRE value for any change in a parameter related to a physical channel or the wireless network. It is therefore possible to choose the optimal CRE value at a given moment of time that will provide the best performance even if the communication conditions are changing. Compared to current static CRE solutions, embodiments herein provide a significant improvement in the network performance, especially when the network is very dynamic, like in cities, with roads, buildings and many UEs.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed.

Existing CRE methods for cell selection do not take into account changes in conditions related to the cells and the user equipments, but only use instantaneous physical knowledge, like for example the received signal strength of the base stations at the UEs.

In embodiments herein a base station computes a CRE value for a cell based on current conditions related to the cell and UEs in the cell, e.g. based on a cell load and on radio conditions of the UEs in the cell. Further, the computed CRE value satisfies an objective function related to the performance of the wireless communications network. The objective function may for example be maximising the sum rate of the UEs in the network. The sum rate of the UEs may be defined as the sum of the data rates of the UEs.

The optimal CRE value may be found using supervised machine learning. A model is trained with UE traffic loads and radio conditions as inputs and the optimal CRE as the output. The problem lays however in finding the optimal CRE value to be used for supervised training.

In embodiments herein an iterative and adaptive method to search around the sub-optimal training data set of the CRE value may be used. New training data may be included in the old training data set to improve the model accuracy and improve the computed CRE asymptotically towards the optimal solution.

Figure 1:
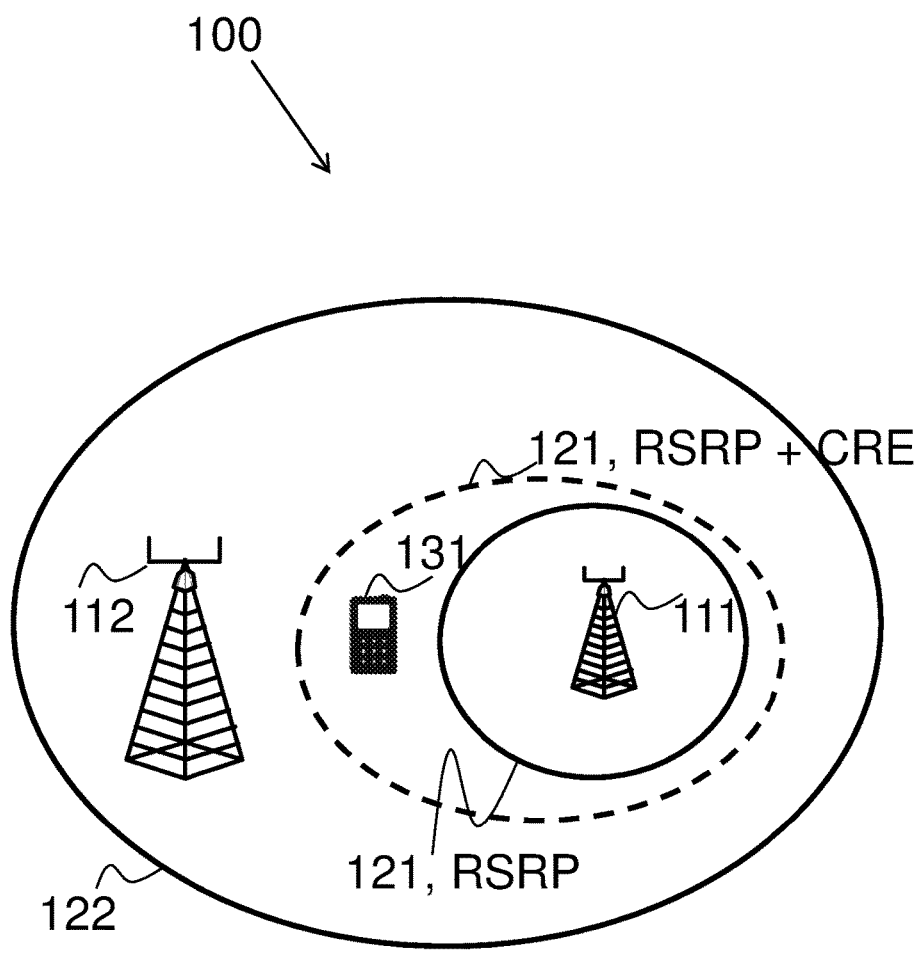
FIG. 1 is a schematic block diagram illustrating embodiments of a wireless communications network.

FIG. 1 depicts a wireless communications network 100 in which embodiments herein may be implemented. The wireless communications network 100 may for example be an LTE network, a wireless Local Area Network (LAN), or any other wireless communications network.

The wireless communications network 100 comprises a network node 111, hereafter referred to as a first base station 111. The wireless communications network 100 may comprise further network nodes, such as a second base station 112. The network nodes may also be access points, for example in a W-Fi network.

Each base station may also be referred to as a NodeB, an evolved Node B (eNB, eNode B), or any other network unit capable of communicating with a user equipment within a cell served by the base station depending e.g. on the radio access technology and terminology used. The base stations may be of different classes such as e.g. macro eNodeB, home eNodeB or pico base station, based on transmission power and thereby also cell size.

In FIG. 1, the network node 111, e.g. the first base station 111, is depicted as a pico base station, while the second base station 112 is depicted as a macro base station. In other embodiments the network node 111, e.g. the first base station 111, may be a macro base station, while the second base station 112 may be a pico base station. However, embodiments herein are not limited to the macro-pico scenario, but may also be implemented in e.g. a macro-macro or pico-pico scenario.

The wireless communications network 100 further comprises cells, served by base stations. The first base station 111 serves a first cell 121. The wireless communications network 100 further comprises a second cell 122. The second cell 122 may be served by the first base station 111. However, in FIG. 1 the second cell 122 is served by the second base station 112.

The wireless communications network 100 further comprises user equipments, such as a user equipment 131, located in a coverage area of the first cell 121 and the second cell 122. The user equipment 131 may also be referred to as a UE, a terminal or a wireless device. The first base station 111 and the second base station 112 may each communicate with the user equipment 131. The communication between the base stations 111, 112 and the user equipment 131 is performed over a radio link.

The user equipment 131 may e.g. be a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to Machine (M2M) devices, even though they do not have any user.

The coverage area of the cells may be virtually increased or decreased by the CRE value. For example, the user equipment 131 may be associated to the second cell 122 if a measured RSRP value from the second cell 122 is higher than a measured RSRP value from the first cell 121 plus the CRE value related to the first cell 121.

Figure 2A:
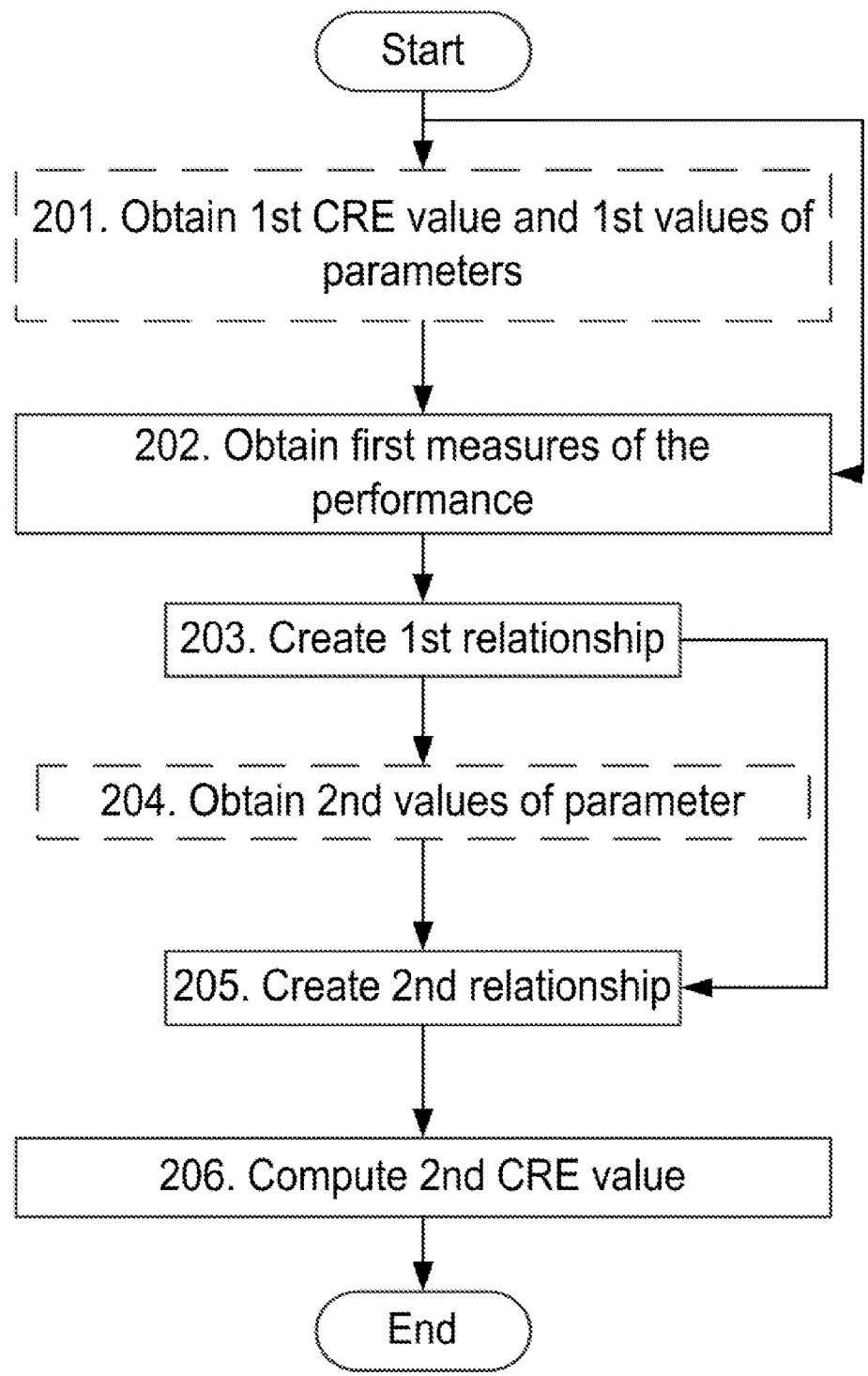
FIG. 2a is a flowchart depicting embodiments of a method in a network node.
Figure 2B:
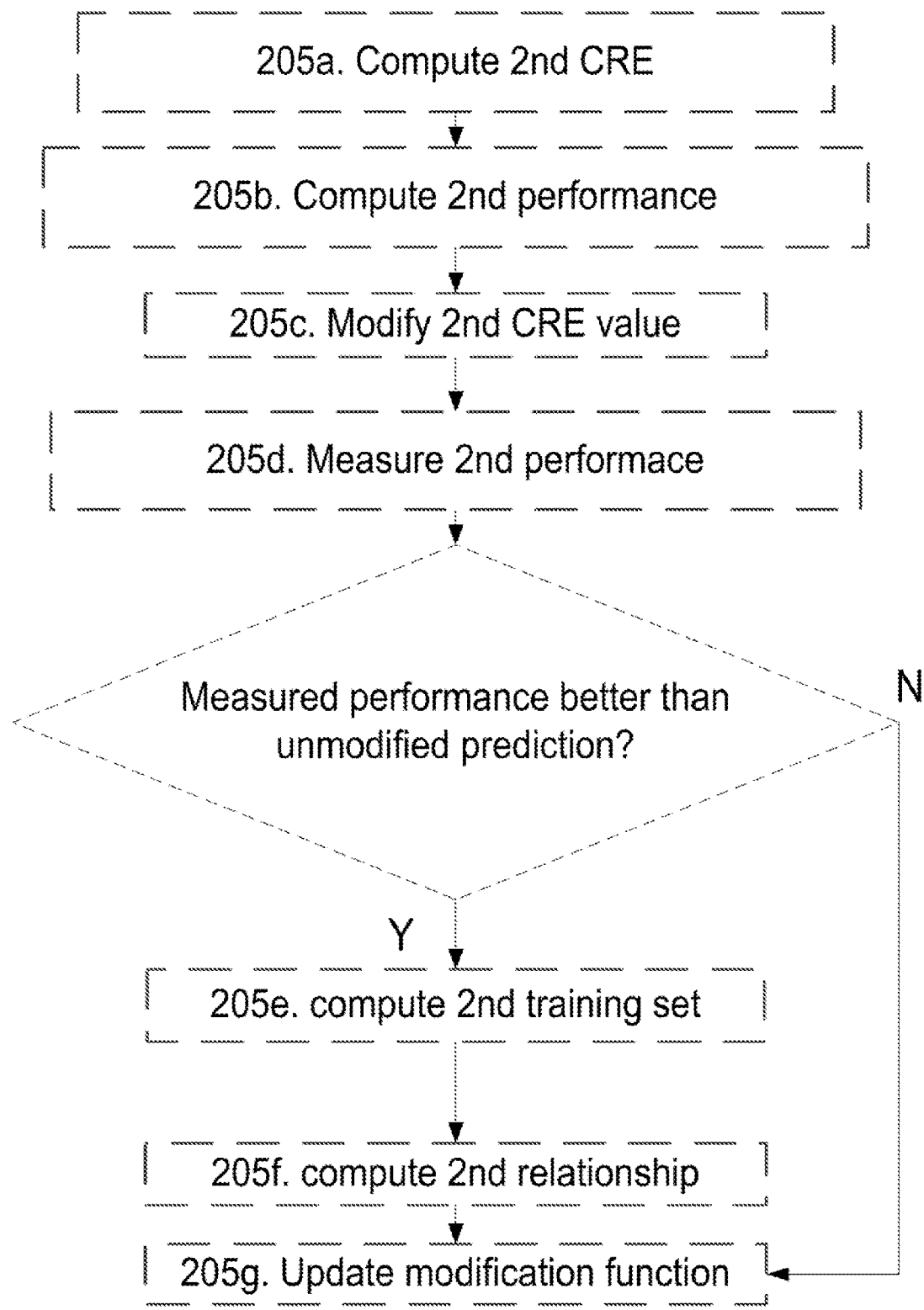
FIG. 2b is a schematic block diagram illustrating further embodiments of a method in a network node.
Figure 2C:
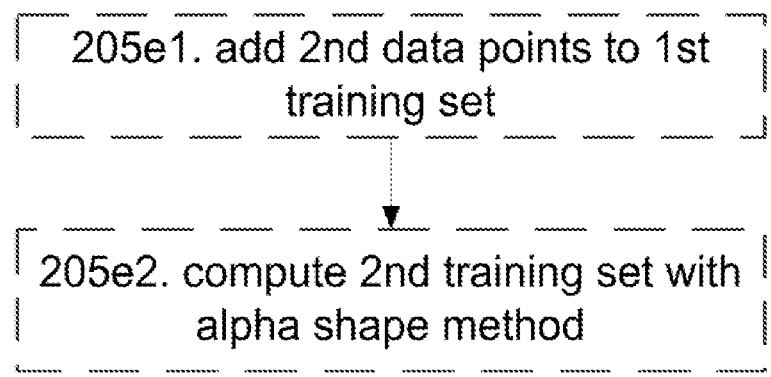
FIG. 2c is a schematic block diagram illustrating further embodiments of a method in a network node.

Embodiments of a method in a network node 111, such as the first base station 111, for computing the CRE value, related to the first cell 121 and the second cell 122, in the wireless communications network 100 will now be described with reference to a flowchart depicted in FIG. 2. In the following the method will be described from the perspective of the first base station 111. However, the method may also be performed in a corresponding way in any other network node that may control the operation of a base station or an access point.

In short, in embodiments herein the first base station 111 computes a CRE value for the first cell 121, which CRE value changes dynamically with the changes in the wireless communications network 100 in order to maximise some performance of the wireless communications network 100. An optimal CRE value may be found using supervised machine learning. A model describing how the optimal CRE value is related to some inputs may be trained with traffic loads of user equipment, such as the user equipment 131, and radio conditions, such as radio conditions of the first cell 121, as the inputs, and the optimal CRE as the output. Further, in embodiments herein a method to find the optimal CRE value to be used for supervised training is disclosed.

The method comprises the following actions, which actions may be taken in any suitable order.

Action 201

In order to compute an optimal CRE value that optimizes an objective function related to the performance of the wireless communications network 100, and that takes into account a dynamic wireless communications network 100, the network node, such as the first base station 111, may obtain measured values of input parameters related to the user equipment 131 and the first cell 121. The measured values of input parameters may also relate to the second cell 122 and any user equipment in the second cell 122, such as the second user equipment 132. In short the first base station 111 may obtain inputs relating to the first cell 121 and the second cell 122 and any user equipment therein. For example, the first base station 111 may obtain the values of the input parameters related to the user equipment 131 from the user equipment 131. In some other embodiments the first base station 111 obtains the values of the input parameters related to the second cell 122 from the second base station 112.

In other words, the network node 111 may obtain a first value of a parameter related to one or more out of: the user equipment 131, the first cell 121, and the second cell 122.

Further, the measured inputs are measured when the first base station 111 applies a first CRE value. Thus, the first value of the parameter is related to the first CRE value. The first CRE value is related to the first cell 121 and to the second cell 122.

The parameter may comprise any one or more out of: a number of user equipments in the first cell 121, a number of user equipments in the second cell 122, a number of network nodes in the first cell 121, a number of network nodes in the second cell 122, a type of network node in the first cell 121, a type of network node in the second cell 122, an average SINR of user equipments in the first cell 121, an average SINR of user equipments in the second cell 122, an average antenna rank of user equipments in the first cell 121, an average antenna rank of user equipments in the second cell 122, a cell load of the first cell 121, a cell load of the second cell 122.

An obtaining module 410 in the network node 111 may be adapted to perform action 201.

Action 202

The network node 111, such as the first base station 111, obtains a first value of a measure of the performance of the wireless communications network 100. The first value of the measure is related to the first CRE value, and the first value of the parameter. This is done in order to create and train a model, or in other words a relationship, that can be trained to find a CRE value that optimises the measure of the performance for varying values of the parameter, i.e. for varying cell conditions.

In some embodiments the measure of the performance of the wireless communications network 100 comprises any one or more out of: a sum of data rates related to the user equipments in the coverage area, a sum of the logarithm of data rates related to the user equipments in the coverage area, a minimum data rate related to the user equipments in the coverage area, a maximum uplink data rate related to the user equipments in the coverage area, and minimum data rate related to the user equipments in the coverage area.

The obtaining module 410 in the network node 111 may be adapted to perform action 202.

Action 203

In order to train the model the network node 111, such as the first base station 111, creates a first relationship relating the first value of the parameter to the first CRE value and the first measure of the performance of the wireless communications network 100.

The creating of the first relationship is based on a first training data set comprising the first CRE value, the first value of the parameter and the first value of the measure of the performance.

In some embodiments the first CRE value is found using supervised machine learning, i.e. the outcome is known in the training phase. The model mentioned above may be trained with the first value of the parameter, e.g. UE traffic loads and radio conditions, as an input parameter and the first CRE as the output. The machine learning model may for example be neural networks, random forest, or linear regression.

The creating of the first relationship may comprise creating an initial relationship based on an initial CRE value obtained with a default strategy.

A computing module 420 in the network node 11 may be adapted to perform action 203.

Action 204

When the conditions of the wireless communications network 100 change, the first base station 111 may obtain new measured values of input parameters related to the user equipment 131 and the first cell 121 and the second cell 122.

In other words, the first base station 111 may obtain a second value of the parameter, for which second value of the parameter the first base station 111 wants to compute a second CRE value that optimises the measure of the performance of the wireless communications network 100. The second value may comprise several values.

The obtaining module 410 may perform action 204.

Action 205

When the conditions of the wireless communications network 100 change there is a need to compute a second CRE value that optimises the measure of the performance for these new conditions, i.e. the new value of the parameter. The model that has been created, for example by using trained machine learning, may then be updated and applied to the new values of the parameter, i.e. the new input parameters.

In other words, the network node 111, such as the first base station 111, creates a second relationship relating a second value of the parameter to a second CRE value and a second value of the measure of the performance of the wireless communications network 100, based on the first relationship and on the second value of the parameter. The second value of the measure of the performance of the wireless communications network 100 corresponds to the second CRE value.

In some embodiments the second CRE value is found based on the machine learning model mentioned above in action 203.

In order to update the model the second relationship may be created according to the sub-actions 205a-205g below, which may be performed in any suitable order. References for the sub-actions 205a-205g are made to FIG. 2b.

In other words, in embodiments herein an iterative and adaptive method to search around the sub-optimal training data set of the CRE value may be used. New training data may be included in the old training data set to improve the model accuracy and improve the computed CRE asymptotically towards the optimal solution.

In short, in action 205a-205g, the first base station 111 predicts, i.e. computes with what is currently a best model, i.e. the first relationship, the performance of the wireless communications network 100, given new input conditions. Then the first base station 111 compares the predicted, i.e. computed, performance of the wireless communications network 100 with a measured performance with the same input conditions and a slightly different CRE value. If the measured performance is better than the predicted performance the model is updated with new training data. As the first base station 111 obtains new values of the input parameter the model gets better at predicting the optimal CRE value.

Action 205a

In some embodiments the network node 111, such as the first base station 111, computes the second CRE value based on the first relationship and the second value of the parameter.

In other words, the first base station 111 may predict the second CRE value for the second value of the parameter, which CRE value optimises the measure of the performance according to the first relationship. The first relationship may be seen as the model as computed from the earlier training.

Action 205b

The network node 111, such as the first base station 111, may compute a computed second value of the measure of the performance of the wireless communications network 100 based on the first relationship, and based on the second value of the parameter.

The computed second value of the measure of the performance will be compared to a measured second value of the measure of the performance in action 205e below. The measured second value of the measure of the performance is measured with a modified second CRE value, as computed in action 205c below.

Action 205c

In some embodiments the network node 111, such as the first base station 111, computes the modified second CRE value based on a random modification of the computed second CRE value.

Action 205d

The network node 111, such as the first base station 111, may obtain the measured second value of the measure of the performance, which measured second value of the measure of the performance is related to the modified second CRE value and to the second value of the parameter.

In other words, the base station applies the modified second CRE value in the live wireless communications network 100, and measures the second value of the performance under these conditions.

Action 205e

In some embodiments, the network node 111, such as the first base station 111, computes a second training data set when a difference between the measured second value of the performance and the computed second value of the measure of the performance represents an improved performance of the wireless communications network 100.

The second training data set is an updated training set compared with the first training set, and improves the model accuracy compared with the first training data set.

When the difference represents a worse performance the first base station 111 will keep the original training set unchanged.

The second training data set may be computed according to the sub-actions 205e1-205e2 below, which may be performed in any suitable order. References for the sub-actions 205e1-205e2 are made to FIG. 2c.

Action 205e1

In some embodiments the network node 111, such as the first base station 111, adds a combination of the second value of the parameter, the modified second CRE value and the measured second measure of the performance to the first training data set.

Action 205e2

Then the network node 111, such as the first base station 111, may compute the second training data set for obtaining the second relationship based on an alpha shape method applied to the first training data set.

Figure 3:
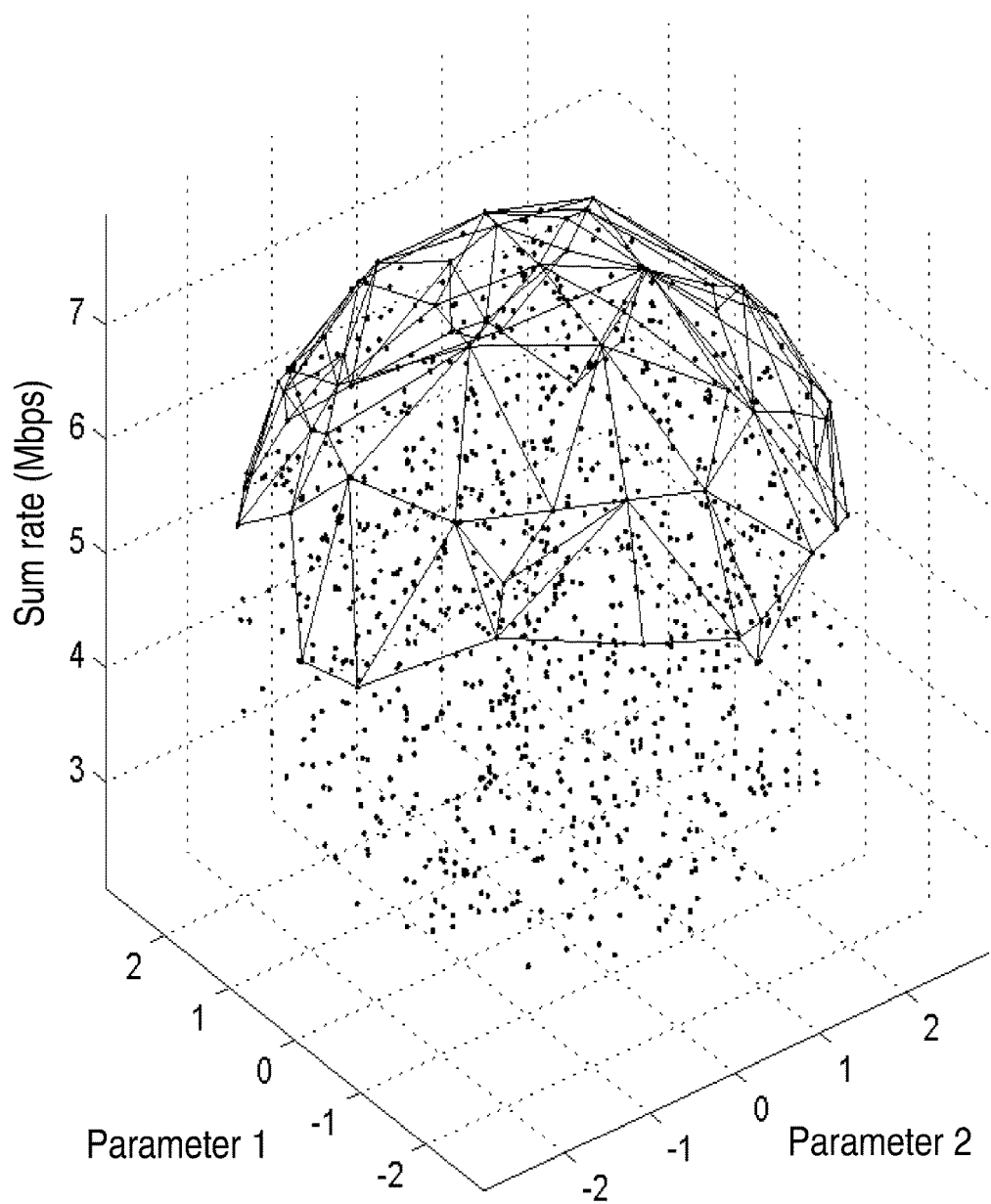
FIG. 3 illustrates a method for selection of a training data set

FIG. 3 illustrates the computing of the second training data set. Since all combinations of UE conditions and cell conditions are usually unique, it is not possible to compare one input-output pair with another. Thus, in some embodiments the network node 111, such as the first base station 111, applies a convex hull method, or a more general method, such as the alpha shape method, to find the second training set.

As an example there are only two input parameters, Parameter 1, e.g. the SINR of the user equipment 131, and Parameter 2, e.g. the load of the user equipment 131. However, the input parameter can have multiple dimensions as mentioned above. Each point in FIG. 3 represents the obtained sum rate for a combination of input parameters and a selected CRE value. The surface indicated by connected points represents the upper part of convex hull for all points which represents the maximum obtained capacity at the current stage. The smoothness of the surface may be adjusted by choosing a different value of a parameter of the alpha shape method. Convex hull is a special case of the alpha shape method when this value is chosen as infinity. The points on the surface are selected as the second training set. By adding a random number to the predicted second CRE value, the network node 111 may find points above the current optimal surface, and thus update the training set used, and improve the trained model.

Action 205f

The network node 111 may compute the second relationship by relating the parameter, the CRE value and the measure of the performance, based on the second training data set.

Action 205g

In some embodiments the network node 111 updates a random modification function used for the random modification of the second CRE value.

For example, the network node 111 may update the random modification function based on the difference between the measured second value of the performance and the predicted second value of the measure of the performance. More specifically, the first network node 111 may update the random modification function based on the statistics or distribution of the difference between the measured second value of the performance and the predicted second value of the measure of the performance.

The random function may also be a fixed function.

In some embodiments the first network node 111 updates a mean value of the random modification function, which mean value, is dependent on a difference between a percentage of positive and negative differences between measured second values of the performance and predicted second values of the measure of the performance. The dependence may for example be linear or non-linear.

In other words, after each iteration the first network node 111 may modify the mean value and a variance used in the random assignment function. The random number added to the predicted second CRE value may be based on how the objective function is improved or not. If m denotes the mean of the random number then m may be updated according to $$m = m + \alpha(p\_+ - p\_-)$$

where p+ represents the percentage of positive modifications of the second CRE value which give higher performance, and p− represents the percentage of negative modifications of the second CRE value which give higher performance. α is a constant.

When both p+ and p− are low, there may be two options. If the first network node 111 is in a normal running state and the first network node 111 wants to keep the wireless communications network 100 as stable as possible, the variance may be decreased so that the training set, and consequently the model, will not be updated often. If the first network node 111 is still in the training phase and suspect a local optimal state is reached, the first network node 111 may increase the variance to test if more training samples are being updated. If not, the system is likely to be in an optimal state.

Action 206

The first network node 111 computes the second CRE value based on a second value of the parameter, and the second relationship, relating the second value of the parameter to the second CRE value.

The first network node 111 may further assign the user equipment 131 to the first cell 121 or the second cell 122 by setting the CRE value of the first cell 121 to the second CRE value.

Figure 4:
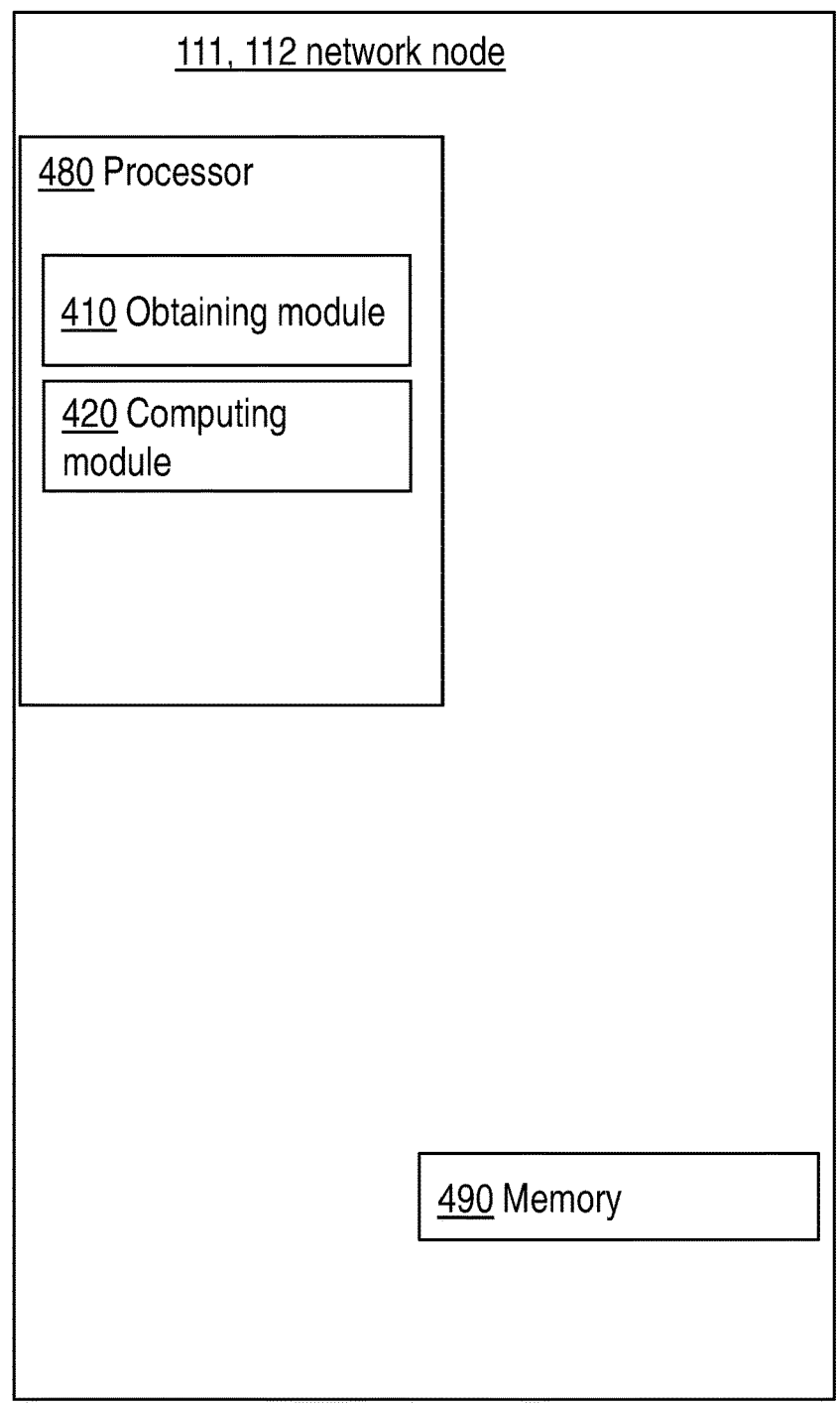
FIG. 4 is a schematic block diagram illustrating embodiments of a network node.

To perform the method actions for computing the CRE value, related to the first cell 121, in the wireless communications network 100 described above in relation to FIG. 2, the network node 111, such as the first base station 111, comprises the following arrangement depicted in FIG. 4.

As mentioned above, the wireless communications network 100 is configured to comprise the first cell 121, the second cell 122, and the user equipment 131 arranged to be located in a coverage area of the first cell 121 and the second cell 122.

In the following the network node 111 will be exemplified with the first base station 111.

The first base station 111 is adapted to, e.g. by means of the obtaining module 410 adapted to, obtain a first value of a measure of the performance of the wireless communications network 100, which first value of the measure is related to a first CRE value, which first CRE value is related to the first cell 121 and the second cell 122, and a first value of a parameter related to one or more out of: the user equipment 131, the first cell 121, and the second cell 122.

In some embodiments the first base station 111 is adapted obtain the first value of the parameter from one or more out of the second base station 112 and the user equipment 131.

The obtaining module 410 may be comprised in a processor 480 in the first base station 111.

The first base station 111 is further adapted to, e.g. by means of the computing module 420 adapted to, create a first relationship relating the first value of the parameter to the first CRE value and the first measure of the performance of the wireless communications network 100. The first relationship is created based on a first training data set comprising the first CRE value, the first value of the parameter and the first value of the measure of the performance.

The computing module 420 may be comprised in the processor 480 in the first base station 111.

The first base station 111 is further adapted to, e.g. by means of the computing module 420 adapted to, create a second relationship relating the second value of the parameter to a second CRE value and a second value of the measure of the performance of the wireless communications network 100. The second relationship is created based on the first relationship and on the second value of the parameter.

The first base station 111 is further adapted to, e.g. by means of a computing module 420 adapted to, compute the second CRE value based on a second value of the parameter and on the second relationship, relating the second value of the parameter to the second CRE value.

In order to create the second relationship, the first base station 111 may further be adapted to, e.g. by means of the computing module 420 adapted to:

compute the second CRE value based on the first relationship and the second value of the parameter;

compute a computed second value of the measure of the performance of the wireless communications network 100 based on the first relationship, and based on the second value of the parameter;

compute a modified second CRE value based on a random modification of the predicted second CRE value;

obtain a measured second value of the measure of the performance, which measured second value of the measure of the performance is related to the modified second CRE value and to the second value of the parameter;

compute a second training data set, when a difference between the measured second value of the performance and the computed second value of the measure of the performance represents an improved performance of the wireless communications network 100; and compute the second relationship by relating the parameter, the CRE value and the measure of the performance, based on the second training data set.

In order to compute the second training data, the first base station 111 may further be adapted to, e.g. by means of the computing module 420 adapted to, add a combination of the second value of the parameter, the modified second CRE value and the measured second measure of the performance to the first training data set and compute the second training data set for obtaining the second relationship based on an alpha shape method applied to the first training data set.

The first base station 111 may further be adapted to, e.g. by means of the computing module 420 adapted to, update a random modification function used for the random modification of the second CRE value.

The first base station 111 may further be adapted to, e.g. by means of the computing module 420 adapted to, update a mean value of the random modification function, which mean value is dependent on a difference between a percentage of positive and negative differences between the measured second values of the performance and the predicted second values of the measure of the performance.

The first base station 111 may further be adapted to, e.g. by means of the computing module 420 adapted to, obtain the parameter comprising any one or more out of: the number of user equipments in the first cell 121, the number of user equipments in the second cell, the number of network nodes in the first cell 121, the number of network nodes in the second cell, the type of network node 111, 112 in the first cell 121, the type of network node 111, 112 in the second cell, an average Signal to Interference and Noise Ratio SINR of the user equipments in the first cell, an average Signal to Interference and Noise Ratio SINR of the user equipments in the second cell, an average antenna rank of the user equipments in the first cell 121, the cell load of the first cell 121, the cell load of the second cell, the percentage of user equipments, located in the coverage area of the first cell 121 and the second cell 122, that is served by the first cell 121, and the percentage of user equipments, located in the coverage area of the first cell 121 and the second cell 122, that is served by the second cell.

The first base station 111 may further be adapted to, e.g. by means of the computing module 420 adapted to, obtain the measure of the performance of the wireless communications network 100 comprising any one or more out of: the sum of data rates related to the user equipments in the coverage area, the sum of the logarithm of data rates related to the user equipments in the coverage area, the minimum data rate related to the user equipments in the coverage area, the maximum uplink data rate related to the user equipments in the coverage area, and minimum data rate related to the user equipments in the coverage area.

The first base station 111 may further be adapted to, e.g. by means of a memory 490 adapted to, store any combination of e.g. the first CRE value, the second CRE value, the first value of the parameter, the second value of the parameter, the first value of the performance, the second value of the performance, the first relationship, the second relationship, the modified second CRE value, the computed second value of the performance, the measured second value of the performance, the first training data set, the second training data set, and the random modification function. The memory 490 comprises one or more memory units. The memory 490 is further adapted to store the input, and configurations and applications to perform the methods herein when being executed in the first base station 111.

The embodiments herein to compute a CRE value in a wireless communications network 100 may be implemented through one or more processors, such as the processor 480 in the first base station 111 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the first base station 111. One such carrier may be in the form of a CD ROM disc. It is however feasible with other data carriers such as a memory stick. The computer program code may furthermore be provided as pure program code on a server and downloaded to the first base station 111.

Those skilled in the art will also appreciate that the obtaining module 410, and the computing module 420 described above may refer to a combination of analogue and digital circuits, and/or one or more processors configured with software and/or firmware, e.g. stored in a memory, that when executed by the one or more processors such as the processor 480 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope, which is defined by the appending claims.

The invention claimed is:

1. A method in a network node for computing a Cell Range Expansion, CRE, value in a wireless communications network, the wireless communications network comprising a first cell, a second cell, and a user equipment located in a coverage area of the first cell and the second cell, the method comprising:
   obtaining a first value of a measure of the performance of the wireless communications network, first value of the measure being related to:
      a first CRE value, related to the first cell and the second cell; and
      a first value of a parameter related to at least one of:
         the user equipment;
         the first cell; and
         the second cell;
   creating a first relationship relating the first value of the parameter to the first CRE value and the first measure of the performance of the wireless communications network based on a first training data set comprising the first CRE value, the first value of the parameter and the first value of the measure of the performance;
   creating a second relationship relating a second value of the parameter to a second CRE value and a second value of the measure of the performance of the wireless communications network based on the first relationship and on the second value of the parameter;
   computing the second CRE value based on:
      a second value of the parameter; and
      the second relationship relating the second value of the parameter to the second CRE value; and
   selecting a cell based on the second CRE value.

2. The method according to claim 1, wherein creating the second relationship comprises:
   computing the second CRE value based on the first relationship and the second value of the parameter;
   computing a computed second value of the measure of the performance of the wireless communications network based on the first relationship and based on the second value of the parameter;
   computing a modified second CRE value based on a random modification of the computed second CRE value;
   obtaining a measured second value of the measure of the performance, the measured second value of the measure of the performance being related to the modified second CRE value and to the second value of the parameter;
when a difference between the measured second value of the measure of the performance and the computed second value of the measure of the performance represents an improved performance of the wireless communications network, computing a second training data set; and
   creating the second relationship by relating the parameter, the CRE value and the measure of the performance, based on the second training data set.

3. The method according to claim 2, wherein computing the second training data set comprises:
   adding a combination of the second value of the parameter, the modified second CRE value and the measured second measure of the performance to the first training data set; and
   computing a second training data set for obtaining the second relationship based on an alpha shape method applied to the first training data set.

4. The method according to claim 3, further comprising:
   updating a random modification function used for the random modification of the second CRE value.

5. The method according to claim 4, wherein updating the random modification function is based on the difference between the measured second value of the performance and the predicted second value of the measure of the performance.

6. The method according to claim 5, wherein updating the random modification function comprises updating a mean value of the random modification function, the mean value being dependent on a difference between a percentage of positive and negative differences between:
   measured second values of the measure of the performance; and
   predicted second values of the measure of the performance.

7. The method according to claim 2, further comprising:
   updating a random modification function used for the random modification of the second CRE value.

8. The method according to claim 7, wherein updating the random modification function is based on the difference between the measured second value of the performance and the predicted second value of the measure of the performance.

9. The method according to claim 7, wherein updating the random modification function comprises updating a mean value of the random modification function, the mean value being dependent on a difference between a percentage of positive and negative differences between:
    measured second values of the measure of the performance; and
    predicted second values of the measure of the performance.

10. The method according to claim 9, wherein the parameter comprises at least one of: a number of user equipments in the first cell, a number of user equipments in the second cell, a number of network nodes in the first cell, a number of network nodes in the second cell, a type of network node in the first cell, a type of network node in the second cell, an average Signal to Interference and Noise Ratio, SINR, of the user equipments in the first cell, an average SINR of the user equipments in the second cell, an average antenna rank of the user equipments in the first cell, a cell load of the first cell, and a cell load of the second cell.

11. The method according to claim 1, wherein the measure of the performance of the wireless communications network comprises at least one of: a sum of data rates related to the user equipments in the coverage area, a sum of the logarithm of data rates related to the user equipments in the coverage area, a minimum data rate related to the user equipments in the coverage area, a maximum uplink data rate related to the user equipments in the coverage area, and minimum data rate related to the user equipments in the coverage area.

12. A network node for computing a Cell Range Expansion, CRE, value in a wireless communications network, the wireless communications network being configured to comprise a first cell, a second cell, and a user equipment arranged to be located in a coverage area of the first cell and the second cell, the network node comprising a processor and a memory, the memory comprising instructions executable by the processor to configure the network node to:
    obtain a first value of a measure of the performance of the wireless communications network, first value of the measure being related to:
        a first CRE value, first CRE value being related to the first cell and the second cell; and
        a first value of a parameter related to at least one of:
            the user equipment;
            the first cell; and
            the second cell;
    create a first relationship relating the first value of the parameter to the first CRE value and the first measure of the performance of the wireless communications network based on a first training data set comprising the first CRE value, the first value of the parameter and the first value of the measure of the performance;
    create a second relationship relating a second value of the parameter to a second CRE value and a second value of the measure of the performance of the wireless communications network based on the first relationship and on the second value of the parameter;
    compute the second CRE value based on:
        a second value of the parameter; and
        the second relationship relating the second value of the parameter to the second CRE value; and
    select a cell based on the second CRE value.

13. The network node according to claim 12, wherein the network node, in order to create the second relationship, is further adapted to:
    compute the second CRE value based on the first relationship and the second value of the parameter;
    compute a computed second value of the measure of the performance of the wireless communications network based on the first relationship and based on the second value of the parameter;
    compute a modified second CRE value based on a random modification of the predicted second CRE value;
    obtain a measured second value of the measure of the performance, the measured second value of the measure of the performance being related to the modified second CRE value and to the second value of the parameter;
    compute a second training data set when a difference between the measured second value of the performance and the computed second value of the measure of the performance represents an improved performance of the wireless communications network; and
    compute the second relationship by relating the parameter, the CRE value and the measure of the performance, based on the second training data set.

14. The network node according to claim 13, wherein the network node, in order to compute the second training data, is further configured to:
    add a combination of the second value of the parameter, the modified second CRE value and the measured second measure of the performance to the first training data set; and
    compute the second training data set for obtaining the second relationship based on an alpha shape method applied to the first training data set.

15. The network node according to claim 14, further configured to update a random modification function used for the random modification of the second CRE value.

16. The network node according to claim 13, further configured to update a random modification function used for the random modification of the second CRE value.

17. The network node according to claim 16, further configured to update the random modification function based on the difference between the measured second value of the performance and the predicted second value of the measure of the performance.

18. The network node according to claim 16, further configured to update a mean value of the random modification function which mean value, is dependent on a difference between a percentage of positive and negative differences between the measured second values of the performance and the predicted second values of the measure of the performance.

19. The network node according to claim 12, wherein the network node is configured to obtain the parameter comprising at least one of: a number of user equipments in the first cell, a number of user equipments in the second cell, a number of network nodes in the first cell, a number of network nodes in the second cell, a type of network node in the first cell, a type of network node in the second cell, an average Signal to Interference and Noise Ratio, SINR, of the user equipments in the first cell, an average SINR of the user equipments in the second cell, an average antenna rank of the user equipments in the first cell, a cell load of the first cell, and a cell load of the second cell.

20. The network node according to claim 12, wherein the network node is configured to obtain the measure of the performance of the wireless communications network comprising at least one of: a sum of data rates related to the user equipments in the coverage area, a sum of the logarithm of data rates related to the user equipments in the coverage area, a minimum data rate related to the user equipments in the coverage area, a maximum uplink data rate related to the user equipments in the coverage area, and minimum data rate related to the user equipments in the coverage area.

* * * * *